| United States Patent [19] | [11] | 4,400,366 |
|---|---|---|
| Sanders | [45] | Aug. 23, 1983 |

[54] METHOD OF MAKING ZEOLITES

[75] Inventor: Robert N. Sanders, Baton Rouge, La.

[73] Assignee: Ethyl Corporation, Richmond, Va.

[21] Appl. No.: 299,878

[22] Filed: Sep. 8, 1981

[51] Int. Cl.$^3$ ............................................. C01B 33/28
[52] U.S. Cl. ..................................... 423/329; 423/118
[58] Field of Search ......................... 423/118, 328–330, 423/334; 252/455 Z

[56] References Cited

U.S. PATENT DOCUMENTS

| 2,882,244 | 4/1959 | Milton | 423/328 |
|---|---|---|---|
| 3,130,007 | 4/1964 | Breck | 423/328 |
| 3,516,786 | 6/1970 | Maher et al. | 423/329 |
| 3,692,475 | 9/1972 | Johnson | 423/329 |
| 3,808,326 | 4/1974 | McDaniel et al. | 423/329 |
| 3,971,631 | 7/1976 | Almagro et al. | 423/334 |
| 4,228,137 | 10/1980 | Taylor et al. | 423/118 |

*Primary Examiner*—Edward J. Meros
*Attorney, Agent, or Firm*—Donald L. Johnson; John F. Sieberth; Paul H. Leonard

[57] ABSTRACT

The present invention relates to a process for producing a crystalline synthetic faujasite wherein an activated sodium silicate system is provided by mixing a sodium silicate solution with a seed amount of the faujasite to be produced and the activated sodium silicate system is reacted with a sodium aluminate solution under controlled conditions to thereby form the desired crystalline synthetic faujasite.

24 Claims, No Drawings

METHOD OF MAKING ZEOLITES

BACKGROUND OF THE INVENTION

1. Field of the Invention

In general, the present invention relates to the production of zeolites.

2. Description of the Prior Art

Certain naturally occurring hydrated metal aluminum silicates are called zeolites. The synthetic adsorbents of the invention have compositions similar to some of the natural zeolites. The most common of these zeolites are sodium zeolites. Zeolites are useful as detergent builders, cracking catalysts and molecular sieves.

Zeolites consist basically of a three-dimensional framework of $SiO_4$ and $AlO_4$ tetrahedra. The tetrahedra are cross-atoms to the total of the aluminum and silicon atoms is equal to two or $O/(Al+Si)=2$. The electrovalence of each tetrahedra containing aluminum is balanced by the inclusion of the crystal of a cation, for example, a sodium ion. This balance may be expressed by the formula $Al/Na=1$. The spaces between the tetrahedra are occupied by water molecules prior to dehydration.

Zeolites "X" and "Y" may be distinguished from other zeolites and silicates on the basis of their X-ray powder diffraction patterns and certain physical characteristics. The X-ray patterns for several of these zeolites are described below. The composition and density are among the characteristics which have been found to be important in identifying these zeolites.

The basic formula for all crystalline sodium zeolites may be represented as follows:

$$Na_2O:Al_2O_3:xSiO_2:yH_2O.$$

In general, a particular crystalline zeolite will have values for x and y that fall in a definite range. The value x for a particular zeolite will vary somewhat since the aluminum atoms and the silicon atoms occupy essentially equivalent positions in the lattice. Minor variations in the relative numbers of these atoms do not significantly alter the crystal structure or physical properties of the zeolite. For zeolite X, an average value for x is about 2.5 with the x value falling within the range $2.5\pm0.5$.

The value of y is not necessarily an invariant for all samples of zeolites. This is true because various exchangeable ions are of different size, and, since there is no major change in the crystal lattice dimensions upon ion exchange, the space available in the pores of the zeolite to accommodate water molecules varies.

The average value for y determined for zeolite X is 6.2.

The formula for zeolite X may be written as follows:

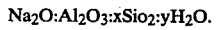
$0.9\pm0.2N_2O:Al_2O_3:2.5\pm0.5SiO_2:yH_2O;$

The formula for zeolite Y may be written as follows:

$0.9\pm0.2Na_2O:Al_2O_3:4.5\pm1.5SiO_2:yH_2O;$ and,

"y" may be any value up to 8 for zeolite X and any value up to 9 for zeolite Y.

The pores of zeolites normally contain water.

The above formulas represent the chemical analysis of zeolites X and Y. When other materials as well as water are in the pores, chemical analysis will show a lower value of y and the presence of other adsorbates.

The presence in the crystal lattice of materials volatile at temperatures below about 600° C. does not significantly alter the usefulness of the zeolites as an adsorbent since the pores are usually freed of such volatile materials during activation.

Among the ways of identifying zeolites and distinguishing them from other zeolites and other crystalline substances, the X-ray powder diffraction pattern has been found to be a useful tool. In obtaining X-ray powder diffraction patterns, standard techniques are employed. The radiation is the Ka doublet of copper, and a Geiger counter spectrometer with a strip chart pen recorder is used. The peak heights, I, and the positions as a function of $2\theta$ where $\theta$ is the Bragg angle, are read from the spectrometer chart. From these, the relative intensities, $100I/I_0$, where $I_0$ is the intensity of the strongest line or peak, and d the interplanar spacing in Å corresponding to the recorded lines are calculated.

X-ray powder diffraction data for sodium zeolite X are given in Table A. $100I/I_0$ and the d values in angstroms (Å) for the observed lines for zeolite X are also given. The X-ray patterns indicate a cubic unit cell of dimensions between 24.5 Å and 25.5 Å. In a separate column are listed the sum of the squares of the Miller indices $(h^2+k^2+l^2)$ for a cubic unit cell that corresponds to the observed lines in the X-ray diffraction patterns. The $a_0$ value for zeolite X is 24.99 Å, where $a_0$ is the unit cell edge.

TABLE A

X-RAY DIFFRACTION PATTERN FOR SYNTHETIC FAUJASITE (ZEOLITE X)

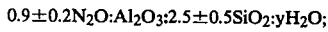

| $h^2+k^2+l^2$ | $\dfrac{100\,I}{I_0}$ | d (Å) |
|---|---|---|
| 3 | 100 | 14.47 |
| 8 | 18 | 8.85 |
| 11 | 12 | 7.54 |
| 19 | 18 | 5.73 |
| 27 | 5 | 4.81 |
| 32 | 9 | 4.42 |
| 35 | 1 | 4.23 |
| 40 | 4 | 3.946 |
| 43 | 21 | 3.808 |
| 44 | 3 | 3.765 |
| 48 | 1 | 3.609 |
| 51 | 1 | 3.500 |
| 56 | 18 | 3.338 |
| 59 | 1 | 3.253 |
| 67 | 4 | 3.051 |
| 72 | 9 | 2.944 |
| 75 | 19 | 2.885 |
| 80 | 8 | 2.794 |
| 83 | 2 | 2.743 |
| 88 | 8 | 2.663 |
| 91 | 3 | 2.620 |
| 96 | 1 | 2.550 |
| 108 | 5 | 2.404 |
| 123 | 1 | 2.254 |
| 128 | 3 | 2.209 |
| 131 | 3 | 2.182 |
| 136 | 2 | 2.141 |
| 139 | 2 | 2.120 |
| 144 | 1 | 2.038 |
| 164 | 1 | 1.952 |
| 168 | 1 | 1.928 |
| 184 | 1 | 1.842 |
| 195 | 1 | 1.789 |
| 200 | 2 | 1.767 |
| 211 | 3 | 1.721 |
| 243 | 3 | 1.603 |

The more significant d values for zeolite X are given in Table B.

TABLE B

MOST SIGNIFICANT d VALUES FOR ZEOLITE X
d Value of Reflection in A 14.45 ± 0.2
8.85 ± 0.1
7.55 ± 0.1
5.75 ± 0.1
4.42 ± 0.05
3.80 ± 0.05
3.33 ± 0.05
2.88 ± 0.05
2.79 ± 0.05
2.66 ± 0.05

Zeolite Y has a characteristic X-ray powder diffraction pattern which may be employed to identify zeolite Y. The X-ray powder diffraction data are shown in Table C. The values for the interplanar spacing d are expressed in angstrom units.

Occasionally, additional lines not belonging to the pattern for the zeolite appear in a pattern along with the X-ray lines characteristic of that zeolite. This is an indication that one or more additional crystalline materials are mixed with the zeolite in the sample being tested. Frequently, these additional materials can be identified as initial reactants in the synthesis of the zeolite, or as other crystalline substances. When the zeolite is heat treated at temperatures of between 100° C. and 600° C. in the presence of water vapor or other gases or vapors, the relative intensities of the lines in the X-ray pattern may be appreciably changed from those existing in the unactivated zeolite patterns. Small changes in line positions may also occur under these conditions. These changes in no way hinder the identification of these X-ray patterns as belonging to the zeolite.

TABLE C

X-RAY DIFFRACTION PATTERN FOR SYNTHETIC FAUJASITE (ZEOLITE Y)

| $h^2 + k^2 + l^2$ | d (Å) | Relative Intensity |
|---|---|---|
| 3 | 14.29 | 100 |
| 8 | 8.75 | 9 |
| 11 | 7.46 | 24 |
| 19 | 5.68 | 44 |
| 27 | 4.76 | 23 |
| 32 | 4.38 | 35 |
| 40 | 3.91 | 12 |
| 43 | 3.775 | 47 |
| 48 | 3.573 | 4 |
| 51 | 3.466 | 9 |
| 56 | 3.308 | 37 |
| 59 | 3.222 | 8 |
| 67 | 3.024 | 16 |
| 72 | 2.917 | 21 |
| 75 | 2.858 | 48 |
| 80 | 2.767 | 20 |
| 83 | 2.717 | 7 |
| 88 | 2.638 | 19 |
| 91 | 2.595 | 11 |
| 108 | 2.381 | 6 |
| 123 | 2.232 | 2 |
| 128 | 2.188 | 4 |
| 131 | 2.162 | 3 |
| 139 | 2.099 | 5 |
| 144 | 2.062 | 3 |
| 164 | 1.933 | 2 |
| 168 | 1.910 | 3 |
| 179 | 1.850 | 2 |
| 187 | 1.810 | 2 |
| 192 | 1.786 | 1 |
| 195 | 1.772 | 2 |
| 200 | 1.750 | 4 |
| 211 | 1.704 | 5 |

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities. Thus, the X-ray data give herein to identify the lattice for a zeolite, are not to exclude those materials, which, due to some variable mentioned or otherwise known to those skilled in the art, fail to show all of the lines, or show a few extra ones that are permissible in the cubic system of that zeolite, or show a slight shift in position of the lines, so as to give a slightly larger or smaller lattice parameter.

A simple test described in "American Mineralogist," Vol. 28, Page 545, 1943, permits a quick check of the silicon to aluminum ratio of the zeolite. According to the description of the test, zeolite minerals with a three-dimensional network that contains aluminum and silicon atoms in an atomic ratio of Al/Si=2/3 =0.67, or greater, produce a gel when treated with hydrochloric acid. Zeolites having smaller aluminum to silicon ratios disintegrate in the presence of hydrochloric acid and precipitate silica. These tests were developed with natural zeolites and may vary slightly when applied to synthetic types.

U.S. Pat. No. 2,882,244 describes a process for making zeolite X comprising preparing a sodium-aluminum-silicate water mixture having an $SiO_2/Al_2O_3$ mole ratio of from 3:1 to 5:1, an $Na_2O/SiO_2$ mole ratio from 1.2:1 to 1.5:1, and an $H_2O/Na_2O$ mole ratio of from 35:1 to 60:1, maintaining the mixture at a temperature of from 20° C. to 120° C. until zeolite X is formed, and separating the zeolite X from the mother liquor.

In U.S. Pat. No. 3,119,659, a kaolin clay and sodium hydroxide are formed into a compact body, dried, reacted in an aqueous mixture at a temperature of from 20° C. to 175° C. until a zeolite is formed. Zeolite X is formed in a reaction mixture having an $Na_2O/SiO_2$ molar ratio of 1.5:1, an $SiO_2/Al_2O_3$ molar ratio of 5:1, and an $H_2O/Na_2O$ molar ratio of 30:1 to 60:1. Zeolite Y is formed in a reaction mixture having an $Na_2O/SiO_2$ molar ratio of 0.5:1, an $SiO_2/Al_2O_3$ molar ratio of 7:1, and an $H_2O/Na_2O$ molar ratio of 20:1 to 40:1.

U.S. Pat. No. 3,920,789 discloses a process for making zeolite Y using elevated temperatures and pressures for the crystallization stage followed by very rapid cooling of the reaction mass.

In U.S. Pat. No. 3,130,007, zeolite Y is formed by preparing an aqueous sodium alumino silicate mixture having a certain composition, maintaining the mixture at a temperature of 20° C. to 125° C. until zeolite Y is formed, and separating the zeolite Y from the mother liquor. Table D shows reaction mixture compositions that produce zeolite Y.

TABLE D

U.S. Pat. No. 3,130,007
REACTION MIXTURE COMPOSITIONS FOR ZEOLITE Y

| $Na_2O/SiO_2$ | $SiO_2/Al_2O_3$ | $H_2O/Na_2O$ |
|---|---|---|
| 0.20–0.40 | 10–40 | 25–60 |
| 0.41–0.60 | 10–30 | 20–60 |
| 0.61–0.80 | 7–30 | 20–60 |
| 0.6–1.0 | 8–30 | 12–90 |
| 1.5–1.7 | 10–30 | 20–90 |

TABLE D-continued

U.S. Pat. No. 3,130,007
REACTION MIXTURE COMPOSITIONS FOR ZEOLITE Y

| $Na_2O/SiO_2$ | $SiO_2/Al_2O_3$ | $H_2O/Na_2O$ |
|---|---|---|
| 1.9–2.1 | 10 | 40–90 |

U.S. Pat. No. 3,130,007 indicates in Column 2, lines 35–42, the necessity of using an active silica source by specifying that aqueous colloidal silica sols or reactive amorphous solid silicas are preferred.

In U.S. Pat. No. 4,016,246, zeolite Y is formed by preparing an aqueous alumino silicate reaction mixture by mixing an alumina component and an $Na_2O$ component with an active hydrate sodium metasilicate to form a certain reaction mixture, then heating the mixture at a temperature of 20° C. to 120° C. until zeolite Y is formed. Table E shows reaction mixture compositions that produce zeolite Y.

TABLE E

U.S. Pat. No. 4,016,246
REACTION MIXTURE COMPOSITIONS FOR ZEOLITE Y

| $Na_2O/SiO_2$ | $SiO_2/Al_2O_3$ | $H_2O/Na_2O$ |
|---|---|---|
| 0.28–<0.30 | 8–10 | 20–70 |
| 0.30–<0.31 | 8–12 | 20–70 |
| 0.31–<0.32 | 8–14 | 20–70 |
| 0.32–<0.34 | 8–16 | 12–90 |
| 0.34–<0.40 | 7–40 | 12–120 |
| 0.4–<0.7 | 5–50 | 12–120 |
| 0.7–<1.0 | 31–50 | 12–120 |

U.S. Pat. No. 4,016,246 also discusses the significance of using an activated source of sodium silicate. In such patent an active hydrated sodium metasilicate is prepared by carefully hydrating sodium metasilicate under specified conditions.

U.S. Pat. No. 4,166,099 discloses a process for preparing crystalline aluminosilicate zeolites, particularly synthetic faujasites such as zeolite type X and zeolite type Y utilizing especially prepared nucleation centers or seeds. Such seed preparation is lengthy and involved.

U.S. Pat. No. 4,164,551 discloses a process for making zeolite Y also utilizing specially prepared nucleation centers.

From the prior art, one would assume that zeolite X cannot be made from reaction mixtures having an $SiO_2/Al_2O_3$ molar ratio greater than 5:1 and that zeolite Y cannot be made from an unreactive source of silica.

SUMMARY OF THE INVENTION

The present invention is directed to the preparation of synthetic faujasites, namely zeolite Y and zeolite X, wherein a seed quantity of bulk zeolite Y or zeolite X is ground to a fine powder and then mixed with sodium silicate, sodium hydroxide and water with agitation for up to about five hours at ambient temperature. The entire system is cooled to about −5° C. to 0° C. and sodium aluminate which has been precooled to about 0° C. is added. The system is warmed up to ambient temperature and then held at such temperature for up to about 16 hours. The mixture is then heated to about 80° C. to 120° C. and reacted at such temperature with stirring until the desired crystalline product is formed. Zeolite Y or zeolite X is filtered out and then dried in an oven.

It is a primary object of the present invention to provide a process for making synthetic zeolite Y or zeolite X which does not require expensive or lengthy preparation of seeds or nucleation centers.

DESCRIPTION OF THE PREFERRED EMBODIMENTS

Zeolites X and Y are names given to synthetic zeolites having the crystal structure of the naturally occurring mineral, faujasite. Zeolite X is the name for those compounds having an $SiO_2/Al_2O_3$ ratio of less than 3 while zeolite Y is the name for those compounds with a ratio of 3 or greater. Zeolite Y is known to have ratios upwards to 7 but those with $SiO_2/Al_2O_3$ in the range of about 4.5 to 5.5 are of greatest importance.

Depending upon whether or not a zeolite X or a zeolite Y is desired, a relatively small quantity of a zeolite X or zeolite Y from a previously prepared bulk product is ground to a very fine powder.

In general, a sodium silicate solution and a sodium aluminate solution are each separately prepared. Sand is dissolved in a sodium hydroxide solution at a pressure of at least 100 psig and a temperature of at least 130° C. to produce a sodium silicate solution having a silica to sodium oxide molar ratio of between 2.0:1 and 2.8:1 for preparing zeolite X and a molar ratio of between 2.0:1 and 2.6:1 for preparing zeolite Y. Any other suitable process for preparing the sodium silicate solution may be used. Any suitable process for preparing the sodium aluminate solution may also be used.

An activated sodium silicate system is prepared by mixing a relatively small amount of the finely ground seed or bulk zeolite of the same type as the synthetic faujasite or zeolite to be prepared, i.e. zeolite X or zeolite Y.

Faujasite may be used in amounts of about one percent to ten percent by weight of the mixture. The amount of seed zeolite used is not critical other than that is should be a sufficient amount to provide the necessary activation of the sodium silicate system. Larger amounts may be used since the zeolite is in the final product, but obviously, the economics diminish as larger quantities are used.

A mixture of faujasite, sodium silicate, sodium hydroxide and water provides a suitable activated system. Activation is accompanied by agitation, with stirring being adequate. Agitation is continued at ambient temperature up to about three hours. Longer time may be used if desired, but should be unnecessary. The mixture or system is then cooled to about −5° C. to about 0° C. Temperature and times may be varied, but the activation period or mixing of bulk or seed zeolite with sodium silicate must be at least about one-half hour.

Preferably, the sodium aluminate solution is independently cooled to a temperature of about 0° C. and then slowly added with agitation to the sodium silicate system. While mixing, the temperature of the system is maintained at or near 0° C. Mixing is continued from about five minutes to about five hours, with three to four hours being preferred and three hours being most preferred.

After addition of the sodium aluminate is completed, agitation is stopped and the system is warmed to ambient temperature. The mixture is then allowed to stand at such temperature up to about sixteen hours. A standing time of about six to sixteen hours is usually necessary in preparing zeolite X.

The reaction mixture comprises a sodium silicate mother liquor and an amorphous sodium alumino silicate pigment and for zeolite X, the mixture has the following molar ratios: sodium oxide to silica—0.4:1 to 1:1, silica to alumina—2.5:1 to 3.5:1; and, water to sodium oxide—20:1 to 50:1; and, preferred molar ratios of 0.4:1 to 0.8:1, 2.6:1 to 3.0:1, and 25:1 to 40:1, respectively, and most preferred molar ratios of 0.6:1, 2.8:1, and 34:1, respectively.

For zeolite Y, the mixture has the following molar ratios: sodium oxide to silica—0.5:1 to 1:1; silica to alumina—10:1 to 20:1; and water to sodium oxide—40:1 to 60:1; and, preferred molar ratios of 0.6:1 to 0.8:1, 11:1 to 15:1, and 45:1 to 50:1, respectively, and, most preferred molar ratios of 0.7:1, 12.5:1, and 47:1, respectively.

After standing, the system is heated to a temperature of about 80° C. to 120° C. and preferably about 90° C. to 105° C. The mixture is reacted at similar temperatures. An oil bath is conveniently used, agitation with stirring or by other suitable means is appropriate. The temperature is maintained until the desired crystalline synthetic faujasite is formed, normally about an hour. The oil bath heating step may be performed at temperatures of about 0° C. to 90° C. for about four to six hours. Such lower temperatures require longer heating times.

In one preferred process, about 5.5 parts of zeolite X powder, on a dry weight basis, is mixed with 100 parts by weight of sodium silicate, 10.6 parts by weight of sodium hydroxide and 307.1 parts by weight of water and stirred at ambient temperature for about three hours. The mixture is then cooled to about −4° C. About 173 parts of sodium aluminate is independently cooled to about 0° C., then added slowly with vigorous agitation to the system while maintaining the temperature at or near 0° C. After addition of the sodium aluminate is complete, agitation is stopped and the system is warmed to ambient temperature. The system is then allowed to stand at such temperature for about 16 hours. The system is then heated in a 110° C. oil bath to a temperature of about 90°–100° C. with stirring. This temperature is maintained for about one hour after which solid zeolite X is filtered out, dried in an oven and recovered.

A similar procedure may be used for producing zeolite Y, except that the starting bulk or seed material is zeolite Y rather than zeolite X. A linear relationship exists between product silica to alumina ratio and the silica utilization. This latter is limited to about 10–20 percent to produce the desired 4.5 ratio product. An alumina to water ratio of at least about 1:330 is required.

The invention is further illustrated by the following examples which set forth various methods and compositions.

Equipment

The reaction vessel was a 3-neck, 1-liter, round-bottom flask. An Ace Glass, Teflon, single-blade, ground glass, joint stirrer was used in the center position. This was driven by an electric motor. The shaft rpm was 200 except during reactant mixing when it was increased to 500 rpm. One neck was equipped with a thermometer. The other neck allowed use of a dropping funnel (syringe needle for those experiments where materials were added during the cool period when the thermometer was replaced with a condenser) during mixing and a condenser during the cook period. The products were filtered on fine frit-glass filter funnels and dried in a 114° C. oven.

Procedure

The sequence of steps was as follows:
1. Seed activation.
2. Mixing of activated seed with balance of sodium silicate and water.
3. Cooling above system in reaction to −2°→−6° C.
4. Adding similarly cooled sodium aluminate to reactor dropwise maintaining temperature below 0° C.
5. Turn off stirrer and remove coolant system for undistrubed gel period.
6. Bring oil bath to 90° C.
7. Contact oil bath with reactor, turn on stirrer and condenser. Start time when system reached 90° C.
8. Filter and dry solids.

Reagents

Sodium aluminate had an average composition of 9.85 percent Na and 11.95 percent $Al_2O_3$.

Commercial sodium silicate with 16.2 percent Si and 6.6 percent Na.

A number of batches of sodium aluminate were used with a typical composition of 9.8 percent Na and 4.7 percent Al with variations as low as 8.9 percent Na and 4.4 percent Al.

Seed Preparation

Seed samples are identified as a, b, c, d, e, and f, and were prepared by following U.S. Pat. No. 4,166,099, Example 1, Method A. All other seed samples were bulk product prepared as the experiment number listed and ground in a mortar with a pestle. Although not wishing to be bound by any particular theory, it is believed that the seed or bulk product is activated when mixed with a sodium silicate solution; however, it is only important that an activated system be prepared. The terms seed activation or activated seed are used herein to describe the step of mixing or contacting the seed or bulk product with a sodium silicate solution or a sodium silicate solution containing caustic and/or water.

In experiments after Run 20, unless otherwise noted, activation was accomplished by refluxing the ground seed, i.e. bulk product, in sodium silicate, with rapid stirring for a period of three hours.

Zeolite X Production

The experimental conditions and results for those experiments where zeolite X was the desired product are listed in Table F.

The experimental conditions and results for those experiments where zeolite Y was the desired product and the ingredients used are described in Table G.

Those experiments where commercial sodium silicate as well as impure sodium silicate were used are described in Table H.

Those experiments where other additions were used to reduce the sodium oxide contents are described in Table I.

The following detailed experimental procedures are examples of the above.

EXAMPLE 1

Bulk product zeolite X in the amount of 6.7 grams, 5.5 grams on a dry basis, was ground in a mortar with a pestle. This was then added to a 1-liter, 3-neck flask equipped with an Ace Glass Company ground glass stirrer assembly equipped with a Teflon blade. This was driven by a Cafromo-type RZR electric stirrer. To the ground seed was added 10.6 grams of NaOH pellets, 100.0 grams of sodium silicate (9.85% Na, 11.90% Si) and 307.1 gram of water and the system stirred at 200 rpm for 3 hours. The reaction and its contents were then cooled to about −5° C. using a refrigerated bath. Independently, 173.0 grams of sodium aluminate (9.6% Na, 5.2% Al) had been cooled in the same bath to −5° C. A thermometer was added at one neck and a dropping funnel with a bypass vent at the other neck. The sodium aluminate was placed in the dropping funnel and the stirrer turned up to 500 rpm. The sodium aluminate was then added, dropwise, over a period of about 20 minutes. The stirrer was then shut off and the refrigerated bath removed. The dropping funnel was replaced by a condenser. The reactor flask was heated in a 90° C. oil bath 16 hours after the addition of the sodium aluminate concluded. The stirrer was at 200 rpm. When the contents of the reactor reached 90° C., the cook time period was started. The contents' temperature ranged from 90°–105° C. and the bath between 90°–112° C. during the cook time. After 4 hours, the unit was shut down and the contents filtered in a 600 ml fine fritt filter funnel. The solids were vacuum dried under aspirator vacuum at 60° C. There was 62.0 grams of product whose analysis corresponds to 1.6 $Na_2O.Al_2O_3$ 2.6 $SiO_2.4.2$ $H_2O$. The crystallinity was 43% of standard.

In this example and the subsequent examples, the standard used was commercial zeolite Y from Linde Division, Union Carbide Corporation.

EXAMPLE 2

The seed was b. The same apparatus, chemicals, quantities and procedures were used as in Example 1. There was 62.0 g of solids which were 500 Å crystallite size faujasite.

EXAMPLE 3

The same apparatus, chemicals and procedures as in Example 1 were used, except that the seed was d (bulk product faujasite, 4.1 g) which was contacted with 150.0 g of sodium silicate for 4 hours prior to use. In this run, 510.8 g of water and 50.0 grams of sodium aluminate were used. The cook period was 6 hours. The product obtained was oven dried at 120° C. for 2–4 hours. There was 12.2 grams of solid product with good faujasite structure. The $SiO_2/Al_2O_3$ ratio was 4.0.

EXAMPLE 4

The same apparatus, chemicals, and procedure as in Example 3 were used, except 4.0 grams of seed was contacted with the sodium silicate for 6 hours prior to use and 479.6 grams of water was used. There was 13.6 grams of product that had the faujasite structure and had an $SiO_2/Al_2O_3$ ratio of 4.5.

EXAMPLE 5

The same apparatus, chemicals, and procedure as in Example 4 were used, except that the 4.0 grams of bulk product was used as seed. This seed was placed in a 200 ml round-bottom flask and refluxed, with stirring, in 150 grams of sodium silicate for 4 hours prior to use. There was 379.6 grams of $H_2O$ and 50.0 grams of sodium aluminate used. There was 13.2 grams of product of faujasite structure where $Al_2O_3/SiO_2$ ratio was 4.8. There was 470.2 grams of by-product liquid that contained 3.2% Si, 0.008% Al, and 3.69% Na.

EXAMPLE 6

The same apparatus, chemicals, and procedures as in Example 5 were used, except that 8.2 grams of bulk product seed was refluxed in 300.0 grams of sodium silicate in a 500 ml round-bottom flask for 3 hours. The activated seed or activated system was stored overnight at −6° C. prior to use. Standard mixing procedure was used with 479.6 grams of $H_2O$ and 100.0 grams of sodium aluminate. There was 24.7 grams of solids of the faujasite structure with minor impurity. The $SiO_2/Al_2O_3$ ratio in the product was 4.2.

EXAMPLE 7

The basic apparatus of Example 1 was used as was the sodium silicate. A new sample of sodium aluminate was used which contained 10.2% Na and 4.2% Al. The seed was 8.2 grams of bulk product. Activation was accomplished by refluxing the bulk product in a 100 ml round-bottom flask with 50.0 grams of sodium silicate for 3 hours. Subsequently, 379.6 grams of water were placed in the reactor and cooled to about 2° C. The activated seed mixture was then added and the system cooled to −6° C. The stirrer was set at 500 rpm and an additional 250.0 grams of sodium silicate and 300.0 grams of sodium aluminate were added dropwise during 2.75 hours. The usual gel period of 16 hours at ambient temperature was then followed by a cook period of 6 hours. There was 110.0 grams of solid with 48% of standard crystallinity, whereas $SiO_2/Al_2O_3$ ratio was 3.3. There was 733.7 grams of by-product liquid that contained 2.26% of $Si_2O$, 0.013% Al, and 4.96% Na.

EXAMPLE 8

The same apparatus and similar sodium silicate as in Example 1 were used, but the sodium aluminate was 8.95% Na and 4.39% Al. There was 8.2 grams of seed (bulk product) activated as in Example 6. A total of 300.0 grams of sodium silicate was used and 379.6 grams of water. This was cooled to −6° C. and mixed with 100.0 grams of sodium aluminate. Usual 16-hour gel period and 6-hour cook period. The system composition was 8.2 $Na_2O.Al_2O_3.12.5$ $SiO_2.333.8$ $H_2O$. There was 48.5 grams of solid of 50% standard crystalinity. The $SiO_2/Al_2O_3$ ratio was 4.2. There was 672.5 grams of liquid whose composition was 3.77% Si, 0.01% Al, and 4.89% Na.

TABLE F

| | | ZEOLITE X PREPARATION | | | | | | | |
|---|---|---|---|---|---|---|---|---|---|
| Run No. | Seed | Seed Quantity (g) | Sodium Silicate (g) | Sodium Aluminate (g) | Water (g) | Gel Time (hr) | Cook Time (hr) | Product (g) | Product Quality |
| 1[5] | a | 7.9 | 100.0 | 173.0[1] | 311.8 | 0[2] | ½ | 64.7 | Type C Zeolite |
| 2[5] | a | 7.9 | 100.0 | 173.0[1] | 311.8 | 0[2] | ½ | 81.4 | Type A Zeolite |
| 3 | b | 8.4 | 100.0 | 173.0[1] | 311.8 | 16 | 4 | 73.7 | Type C Zeolite |
| 4 | b | 7.6 | 100.0 | 173.0[3] | 307.1 | 16 | 2 | 74.7 | Zeolite X |

TABLE F-continued

ZEOLITE X PREPARATION

| Run No. | Seed | Seed Quantity (g) | Sodium Silicate (g) | Sodium Aluminate (g) | Water (g) | Gel Time (hr) | Cook Time (hr) | Product (g) | Product Quality |
|---|---|---|---|---|---|---|---|---|---|
| 5 | b | 7.6 | 100.0 | 173.0[3] | 307.1 | 16 | 2 | 81.1 | Zeolite X |
| 6 | b | 7.6 | 100.0 | 173.0[3] | 307.1 | 16[2] | 2 | 94.2 | Type C Zeolite |
| 7 | b | 7.6 | 100.0 | 173.0[3] | 307.1 | 0 | ½ | nil | — |
| 8 | b | 7.6 | 100.0 | 173.0[3] | 307.1 | 16 | 4 | 62.0 | Zeolite X |
| 9 | c | 6.7 | 100.0 | 173.0[3] | 307.1 | 16 | 4 | 62.0 | Zeolite X |
| 10 | c | 6.7 | 100.0 | 173.0[3] | 307.1 | 16 | 4 | [4] | Small amt. of X |
| 11 | d | 8.0 | 100.0 | 173.0[3] | 307.1 | 16 | 4 | 44.0 | Zeolite X |
| 12 | c | 7.6[6] | 100.0 | 173.0[3] | 307.1 | 16 | 2 | [4] | Zeolite X |
| 13 | c | 7.6[7] | 100.0 | 173.0[3] | 307.1 | 16 | 2 | [8] | Amorphous |

[1] 68.0 g of NaOH added.
[2] Mixed at ambient temperature.
[3] 10.6 g of NaOH added.
[4] Filter fritt broke.
[5] Vacuum dried.
[6] Seed stirred with sodium silicate and water prior to use for 16 hours.
[7] Seed used immediately after contact with sodium silicate.
[8] Not weighed.

TABLE G

ZEOLITE Y PREPARATION

| Run No. | Seed | Seed Activated | Seed Quantity (g) | Sodium Silicate (g) | Sodium Aluminate (g) | Water (g) | Gel Time (hr) | Cook Time (hr) | Product (g) | Crystallinity | SiO$_2$/Al$_2$O$_3$ | Si Utilization |
|---|---|---|---|---|---|---|---|---|---|---|---|---|
| 14 | d | No[17] | 3.3 | 97.5 | 50.0[1] | 510.8 | 16 | 4 | 11.8 | Good | 3.5 | — |
| 15 | c | Yes[2] | 3.3 | 97.5 | 50.0[1] | 510.8 | 16 | 4 | 14.1 | None[3] | — | — |
| 16 | d | Yes[2] | 4.1 | 150.0 | 50.0 | 510.8 | 16 | 4 | 12.2 | Excellent | 4.0 | — |
| 17 | e | Yes[4] | 4.0 | 150.0 | 50.0 | 479.6 | 16 | 4 | 13.6 | Good | 4.5 | — |
| 18 | f | Yes[4] | 4.0 | 150.0 | 50.0 | 479.6 | 16 | 4 | 17.8 | Poor | 5.3 | 16.0 |
| 19 | e | Yes[4] | 4.0 | 150.0 | 50.0 | 379.6 | 16 | 4 | 13.2 | Excellent | 4.0 | 11.2 |
| 20 | g | Yes[5] | 4.0 | 150.0 | 50.0 | 379.6 | 16 | 4 | 13.2 | Good | 4.8 | 15.7 |
| 21 | d | Yes[4] | 4.1 | 150.0 | 50.0 | 379.6 | 16 | 4 | 13.6 | Best to date | 4.1 | 13.7 |
| 22 | d | Yes[4] | 5.1 | 187.5 | 62.5 | 329.6 | 16 | 4 | 18.0 | Good | 3.8 | — |
| 23 | d | Yes[4] | 8.2 | 300.0 | 100.0 | 479.6 | 16 | 4 | 32.4 | Excellent | 3.9 | 13.9 |
| 24 | g[6] | Yes[5] | 4.1 | 150.0 | 50.0 | 379.6 | 16 | 4 | 13.6 | Good | 4.4 | — |
| 25 | h | Yes[5] | 8.2 | 300.0 | 100.0 | 479.6 | 16 | 4 | 24.9 | Good | 4.6 | — |
| 26 | d | Yes[5] | 8.1 | 300.0 | 100.0 | 479.6 | 16 | 4 | 33.9 | Excellent | 3.9 | 9.3 |
| 27 | i | No[17] | 8.1 | 300.0 | 100.0[7] | 479.6 | 16 | 4 | 42.4 | Fair | 3.9 | 18.3 |
| 28 | j | Yes[5] | 8.2 | 300.0 | 100.0 | 479.6 | 16 | 4 | 24.7 | Good | 4.6 | 23.0 |
| 29 | k | Yes[5] | 8.2 | 300.0 | 200.0[7] | 479.6 | 16 | 5 | 40.0 | Good | 4.1 | 16.7 |
| 30 | l | Yes[5] | 8.2 | 300.0 | 300.0[8] | 479.6 | 16 | 4[9] | 74.8 | Excellent[10] | 3.4 | 38.4 |
| 31 | m | Yes[11] | 8.2 | 300.0 | 100.0 | 479.6 | 16 | 6 | 24.7[12] | Good | 4.2 | — |
| 32 | n | Yes[5] | 12.3 | 450.0 | 450.0[8] | 229.6 | 16 | 23 | 121.0 | 24%[13] | 3.5 | 24.8 |
| 33 | l | Yes[5] | 8.2 | 300.0 | 300.0[8] | 479.6 | 16 | 4 | 79.8 | 77% | 3.6 | 37.8 |
| 34 | l | Yes[5] | 8.2 | 300.0 | 300.0[8] | 479.6 | 16 | 24 | 84.7 | 32% | 3.7 | 38.1 |
| 35 | l | Yes[5] | 8.2 | 300.0 | 300.0 | 479.6 | 16 | 6-22[9] | 83.5 | 63% | 3.3 | 43.6 |
| 36 | o | Yes[5] | 5.5 | 300.0[14] | 300.0[8] | 333.4 | 16 | 6 | 89.3 | 80% | 3.3 | 40.7 |
| 37 | n | Yes[15] | 5.2 | 300.0[14] | 300.0[16] | 333.4 | 24 | 6 | 113.8 | 42% | — | — |
| 38 | p | Yes[5] | 5.2 | 300.0[14] | 300.0[16] | 333.4 | 72 | 6 | 102.4 | 5% | — | — |
| 39 | i | No[17] | 8.2 | 300.0[14] | 300.0[8] | 333.4 | 16 | 6 | 108.5 | 0% | — | — |
| 40 | i | No[17] | 8.2 | 300.0[14] | 300.0[8] | 233.4 | 16 | 6 | 113.4 | 7% | — | — |
| 41 | o | Yes[18] | 8.2 | 300.0[14] | 300.0[8] | 379.6 | 16 | 6 | 110.0 | 57% | 3.3 | 53.6 |
| 42 | q | No[17] | 8.2 | 300.0[14] | 300.0[8] | 333.4 | 16 | 6 | 118.5 | 0% | — | — |
| 43 | q | No[17] | 8.2 | 300.0[14] | 300.0[8] | 233.4 | 16 | 6 | 112.7 | 0% | — | — |
| 44 | r | Yes | 5.2 | 300.0[14] | 300.0[8] | 379.6 | 16[19] | 6 | 130.4 | 4% | — | — |
| 45 | n | Yes | 8.2 | 300.0 | 300.0 | 479.6 | 16 | 6 | 51.2 | 67% | 4.2 | 27.1 |
| 46 | i | No[17] | 0.8 | 282.7 | 111.7 | 0.0 | 16 | 6 | 40.0 | 16% | — | — |
| 47 | n | Yes[15] | 8.2 | 300.0 | 100.0 | 379.6 | 16 | 6 | 45.4 | 49% | 4.1 | 28.8 |
| 48 | s | Yes | 8.2 | 300.0 | 100.0 | 379.6 | 16 | 6 | 48.5 | 71% | 4.2 | 29.0 |

TABLE G-continued

ZEOLITE Y PREPARATION

| Run No. | Seed | Seed Activated | Seed Quantity (g) | Sodium Silicate (g) | Sodium Aluminate (g) | Water (g) | Gel Time (hr) | Cook Time (hr) | Product (g) | Crystallinity | $SiO_2$/$Al_2O_3$ | Si Utilization |
|---|---|---|---|---|---|---|---|---|---|---|---|---|
| 49 | s | Yes | 8.2 | 300.0 | 100.0 | 279.6 | 16 | 6 | 55.0 | 33.0 | — | — |

[1] 9.0 Grams NaOH added.
[2] Contact at ambient temperature with sodium silicate for 4 hours.
[3] Sodium Harmotome was product.
[4] Contact at ambient temperature with sodium silicate for 6 hours.
[5] Refluxed seed in sodium silicate for 4 hours.
[6] Seed reground.
[7] Half added during cook period.
[8] Two thirds added during cook period.
[9] Stood for 16 hours after cook prior to filtering.
[10] Became standard for crystallinity. Was 85% of Linde product in crystallinity.
[11] Refluxed in sodium silicate for 3 hours prior to use.
[12] Filter broke, approximate weight.
[13] Percent of Run 30 Standard; all subsequent reports will be on this basis.
[14] One third added during cook period.
[15] Stored at −6° C. for 16 hours prior to use.
[16] 78 Percent added during cook.
[17] Seed prepared by Grace patent procedure.
[18] Seed refluxed 3 hours in 50.0 sodium silicate. Standard procedure from here on.
[19] pH Adjusted to 10.4 after mixing prior to gelling.

TABLE H

ZEOLITE Y PREPARATION WITH ADDED COMMERCIAL SODIUM SILICATE

| Run No. | Seed | Seed Activated | Quantity (g) | Sodium Silicate (g) | Commercial Sodium Silicate (g) | Sodium Aluminate (g) | Water (g) | Gel Time (hr) | Cook Time (hr) | Product (g) | Crystallinity | $SiO_3$/$Al_2O_3$ | Si Utilization |
|---|---|---|---|---|---|---|---|---|---|---|---|---|---|
| 50 | e | Yes[1] | 3.7 | 50.8 | 76.9 | 50.0 | 388.8 | 16 | 4 | 21.5 | Amorph. | — | — |
| 51 | o | Yes[2] | 8.2 | 244.1[3] | 50.0 | 300.0[4] | 379.6 | 16 | 6 | 121.6 | 18% | — | — |
| 52 | o | Yes[2] | 5.2 | 194.1[6] | 100.0 | 300.0[4] | 379.6 | 16 | 6 | 111.2 | 6% | — | — |
| 53 | o | Yes[2] | 5.2 | 200.0[8] | 50.0 | 300.0[4] | 379.6 | 16 | 6 | 122.0 | 61%[5] | 3.4 | 54.3 |
| 54 | o | Yes[2] | 5.2 | 194.1[6] | 100.0 | 300.0[4] | 379.6 | 16 | 6 | 114.5 | 19% | — | — |
| 55 | r | Yes[7] | 5.2 | 150.0[8] | 150.0 | 300.0[4] | 379.6 | 16 | 6 | 125.5 | 6% | — | — |
| 56 | r | Yes[9] | 5.2 | 250.0 | 50.0 | 300.0[4] | 379.6 | 16 | 6 | 120.8 | 7% | — | — |
| 57 | r | Yes[10] | 5.2 | 250.0[8] | 50.0 | 300.0[4] | 379.6 | 16[11] | 6 | 126.6 | Amorph. | — | — |

[1] Contact with sodium silicate for 6 hours.
[2] Refluxed in 50.0 g of commercial sodium silicate for 3 hours; seed agglomerated badly.
[3] 100 grams of this added during cook period.
[4] 78 percent added during cook period.
[5] Crystallinity percentages of Run 30 standard are given.
[6] 52 percent added during cook period.
[7] Refluxed in 50.0 g of sodium silicate for 3 hours.
[8] Half added during cook period.
[9] Sodium silicate and commercial sodium silicate mixed and refluxed with seed 3 hours.
[10] Refluxed in 100.0 g sodium silicate for 3 hours.
[11] pH Adjusted to 10.5 after gel period ended.

TABLE I

ZEOLITE Y PREPARATIONS, ADDITIVES

| Run No. | Seed[1] | Seed Quantity (g) | Sodium Silicate (g) | Sodium Aluminate (g) | Water (g) | Additive | Quantity (g) | Point of Addition[2] | Observations |
|---|---|---|---|---|---|---|---|---|---|
| 58 | i | 0.8 | 224.9 | 111.7 | 0.0 | HCL | 69.4 | During mixing | 66.3 g of amorphous solids. |
| 59 | i | 0.8 | 224.9 | 111.7 | 0.0 | HCL | 69.4 | After mixing | Solids were amorphous. |
| 60 | t | 1.0 | 314.9 | 46.9 | 76.9 | $Al_2(SO_4)_3 \cdot 18H_2O$ | 59.4 | After mixing | Gel so stiff could not be stirred. |
| 61 | s | 8.2 | 300.0 | 50.0 | 190.5 | $Al_2(SO_4)_3 \cdot 18\ H_2O$ | 27.2 | During cook heat up | No gel observed All impurities. |
| 62 | s | 8.2 | 300.0 | 50.0 | 161.3 | $H_2SO_4$ | | During cook heat up | All impurity. Difficult stirring. |

[1] All seed activated by reflux in 100.0 g sodium silicate for 3 hours, used immediately.
[2] Gel period was 16 hours; cook period 6 hours.

The foregoing disclosure and description of the invention is illustrative and explanatory thereof and various changes in the illustrated process may be made within the scope of the appended claims without departing from the spirit of the invention.

What is claimed is:

1. A method of producing a crystalline synthetic faujasite, comprising the steps of separately preparing a sodium silicate solution and a sodium aluminate solution, providing an activated system comprising a sodium silicate solution mixed with agitation for a period of at least about one-half hour with a seed amount of bulk synthetic faujasite of the type product desired ground to a fine powder at a temperature up to about 0° C. mixing the sodium aluminate solution with the activated system over a period of up to about five hours to provide a mixture having a silica to alumina molar ratio of between 2.5:1 and 15:1, allowing the mixture to stand for up to about sixteen hours at a temperature from about 0° C. to ambient, heating the mixture to a temperature of about 90° C.–105° C., reacting the mixture at a temperature of about 90° C.–105° C. until the desired crystalline synthetic faujasite is formed, and recovering said faujasite.

2. The method of claim 1, wherein said crystalline synthetic faujasite is zeolite Y.

3. The method of claim 1, wherein said crystalline synthetic faujasite is zeolite X.

4. The method of claim 1, wherein the activating faujasite is added in an amount of about 1% to 10% by weight of the mixture.

5. The method of claim 1, wherein the mixing period for the sodium aluminate solution with the activated system is about three to four hours.

6. The method of claim 1, wherein the reaction mixture is allowed to stand at ambient temperature.

7. The method of claim 1, wherein the reaction mixture is allowed to stand for a period of time of at least six hours.

8. The method of claim 1, wherein the total mixture has the following molar ratio:

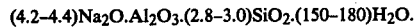

$(4.2-4.4)Na_2O.Al_2O_3.(2.8-3.0)SiO_2.(150-180)H_2O.$

9. The method of claim 1, wherein the reactants are mixed at a temperature at least as low as about 0° C.

10. The method of claim 1, wherein agitation is by stirring.

11. A method of preparing a crystalline zeolite Y, comprising the steps of:
(a) dissolving sand in a sodium hydroxide solution at a pressure of at least 100 psig and a temperature of at least 130° C. to produce a sodium silicate solution having a silica to sodium oxide molar ratio of between 2.0:1 and 2.6:1;
(b) providing an activated system comprising a sodium silicate solution mixed with agitation for a period of at least about one-half hour with a seed amount of bulk zeolite Y ground to a fine powder at a temperature up to about 0° C.;
(c) forming a sodium aluminate solution;
(d) adding the sodium aluminate to the activated system over a period of from about five minutes to five hours with stirring to produce a reaction mixture comprising a sodium silicate mother liquor and an amorphous sodium alumino silicate pigment, said mixture having a sodium oxide to silica molar ratio of between 0.5:1 and 1:1, a silica to alumina molar ratio of between 10:1 and 15:1, and a water to sodium oxide molar ratio of between 40:1 and 60:1;
(e) allowing the mixture to stand up to about 16 hours at a temperature of about 0° C. to ambient;
(f) heating and reacting the mixture at a temperature of about 90° C.–105° C. until crystalline zeolite Y is formed; and
(g) recovering the zeolite Y.

12. The method of claim 11, wherein the seed amount of bulk zeolite Y is about one percent to about ten percent by weight of the mixture.

13. The method of claim 11, wherein the temperature of step (b) is from about −5° C. to about 0° C.

14. The method of claim 11, wherein step (d), the mixture has the following molar ratios:
sodium oxide to silica—0.6:1 to 0.8:1
silica to alumina—11:1 to 15:1
water to sodium oxide—45:1 to 50:1

15. The method of claim 11, wherein step (d), the mixture has the following molar ratios;
sodium oxide to silica—0.7:1
silica to alumina—12.5:1
water to sodium oxide—47:1

16. The method of claim 11, wherein in step (e), the period of standing or warming is about six to sixteen hours.

17. The method of claim 11, wherein in step (e), the temperature is ambient temperature.

18. A method of preparing a crystalline zeolite X, comprising the steps of:
(a) dissolving sand in a sodium hydroxide solution at a pressure of at least 100 psig and a temperature of at least 130° C. to produce a sodium silicate solution having a silica to sodium oxide molar ratio of between 2.0:1 and 2.8:1;
(b) providing an activated system comprising a sodium silicate solution mixed with agitation for a period of at least about one-half hour with a seed amount of bulk zeolite X ground to a fine powder at a temperature up to about 0° C.;
(c) forming a sodium aluminate solution;
(d) adding the sodium aluminate to the activated system over a period of time from about seven minutes to about 30 minutes with stirring to produce a reaction mixture comprising a sodium silicate mother liquor and an amorphous sodium alumino silicate pigment, said mixture having a sodium oxide to silica molar ratio of between 0.4:1 and 1:1, a silica to alumina molar ratio of between 2.5:1 and 3.5:1, and water to sodium oxide molar ratio of between 20:1 and 50:1;
(e) allowing the mixture to stand for up to about 16 hours at a temperature of about 0° C. to ambient;
(f) heating and reacting the mixture at a temperature of from about 90° C.–105° C. until crystalline zeolite X is formed; and,
(g) recovering the zeolite X.

19. The method of claim 18, wherein the seed amount of bulk zeolite X is about one percent to about ten percent by weight of the mixture.

20. The method of claim 18 wherein the temperature of step (b) is from about −5° C. up to about 0° C.

21. The method of claim 18, wherein in step (d), the mixture has the following molar ratios:
sodium oxide to silica—0.4:1 to 0.8:1
silica to alumina—2.6:1 to 3.0:1
water to sodium oxide—25:1 to 40:1.

22. The method of claim 18, wherein in step (d), the mixture has the following molar ratios:
sodium oxide to silica—0.6:1
silica to alumina—2.8:1
water to sodium oxide—34:1.

23. The method of claim 18, wherein in step (e), the period of standing or warming is about six to sixteen hours.

24. The method of claim 18, wherein in step (e), the temperature is ambient temperature.

* * * * *

UNITED STATES PATENT AND TRADEMARK OFFICE
CERTIFICATE OF CORRECTION

PATENT NO. : 4,400,366

DATED : August 23, 1983

INVENTOR(S) : ROBERT N. SANDERS

It is certified that error appears in the above-identified patent and that said Letters Patent is hereby corrected as shown below:

Column 4, line 10, reads "give", should read --given--.

Column 8, line 11, reads "undistrubed", should read --undisturbed--.

Column 16, line 39, reads "molarratio", should read --molar ratio--.

Column 1, line 17, reads "cross-atoms to the total", should read --cross-atoms linked by the sharing of oxygen atoms so that the ratio of oxygen to the total--.

Signed and Sealed this

Seventeenth Day of July 1984

[SEAL]

Attest:

GERALD J. MOSSINGHOFF

Attesting Officer     Commissioner of Patents and Trademarks